United States Patent
Kirubanandam et al.

(10) Patent No.: US 9,864,601 B2
(45) Date of Patent: Jan. 9, 2018

(54) RESOURCE MANAGEMENT IN DISTRIBUTED COMPUTER SYSTEMS USING DISPERSION RULES

(71) Applicant: VMware, Inc., Palo Alto, CA (US)

(72) Inventors: Jeevitha Kirubanandam, Sunnyvale, CA (US); Aashish Parikh, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 217 days.

(21) Appl. No.: 14/675,499

(22) Filed: Mar. 31, 2015

(65) Prior Publication Data

US 2016/0294934 A1 Oct. 6, 2016

(51) Int. Cl.
G06F 15/173 (2006.01)
G06F 9/00 (2006.01)
H04L 12/24 (2006.01)
H04L 29/08 (2006.01)

(52) U.S. Cl.
CPC ............ *G06F 9/00* (2013.01); *H04L 41/00* (2013.01); *H04L 67/1023* (2013.01)

(58) Field of Classification Search
CPC .................................................. H04L 67/1012
See application file for complete search history.

(56) References Cited

U.S. PATENT DOCUMENTS

2009/0070771 A1* 3/2009 Yuyitung ............... G06Q 10/06 718/105
2009/0300173 A1* 12/2009 Bakman ............... G06F 11/008 709/224

OTHER PUBLICATIONS

Gulati et al. "Distributed Resource Management: Design, Implementation and Lessons Learned", VMware TechPubs, 2012.
Shanmuganathan, Ganesha et al.; "PRM: Proactive Resource Management Using Spare Resources"; VMware Radio, 2013.
Proactive DRS fling http://labs.vmware.com/flings/proactive-drs/, version 1.0; Aug. 26, 2013.

* cited by examiner

*Primary Examiner* — Vivek Srivastava
*Assistant Examiner* — Nicholas Celani (57) ABSTRACT

A resource management system and method for performing resource management operations in a distributed computer system uses a dispersion rule to try to uniformly disperse clients in a cluster of host computers in the distributed computer system. The dispersion rule is used to compute a dispersion score for at least one candidate distribution of the clients in the cluster of host computers, which is used to select a particular candidate distribution of the clients in the cluster of host computers to disperse the clients.

20 Claims, 6 Drawing Sheets

RESOURCE MANAGEMENT IN DISTRIBUTED COMPUTER SYSTEMS USING DISPERSION RULES

BACKGROUND

Sharing resources in a networked computer system, such as processors, computer memories, network bandwidth and data storage facilities, among clients, e.g., virtual machines (VMs), running on the system can increase efficiency by reducing maintenance and operating costs, allowing flexibility with respect to individual resource usage, and simplifying resource management. With respect to shared storage, the benefits include data consolidation, universal access to data, ease of storage management, and support for live migration of virtualized environments. Thus, efficiently and effectively managing the shared resources for the clients running in the networked computer system is an important task to ensure that the clients are operating at their desired levels.

Since clients share available resources in a distributed computer system, contentions for resources between the clients can arise, which may degrade the performance of the clients. Conventional resource management solutions for load balancing may resolves some of these resource contentions, but do not effectively address many of these resource contentions, especially those that results directly from a one-time or scheduled event involving multiple clients. One recourse for users today is to use anti-affinity rules to explicitly identify clients that suffer from co-location and/or have business/operational reasons to remain on different host computers. While useful in some specific cases, anti-affinity rules are applied in an all-or-nothing fashion by resource management systems and thus, are ineffective in numerous cases.

SUMMARY

A resource management system and method for performing resource management operations in a distributed computer system uses a dispersion rule to try to uniformly disperse clients in a cluster of host computers in the distributed computer system. The dispersion rule is used to compute a dispersion score for at least one candidate distribution of the clients in the cluster of host computers, which is used to select a particular candidate distribution of the clients in the cluster of host computers to disperse the clients.

A method for performing resource management operations in a distributed computer system in accordance with an embodiment of the invention comprises creating a dispersion rule for a group of clients, computing a dispersion score for the dispersion rule for at least one candidate distribution of the clients in a cluster of host computers in the distributed computer system, selecting a particular candidate distribution of the clients in the cluster of host computers based at least partly on the dispersion score of the particular candidate distribution, and placing at least one of the clients in one of the host computers in the cluster in accordance with the particular possible distribution of the clients in the host computers. In some embodiments, the steps of this method are performed when program instructions contained in a computer-readable storage medium are executed by one or more processors.

A resource management system supported by hardware in a distributed computer system in accordance with an embodiment of the invention comprises a dispersion rule creation unit configured to create a dispersion rule for a group of clients, a dispersion score generation unit configured to compute a dispersion score for the dispersion rule for at least one candidate distribution of the clients in a cluster of host computers in the distributed computer system, and a resource management module configured to select a particular candidate distribution of the clients in the cluster of host computers based at least partly on the dispersion score of the particular candidate distribution. The resource management module is further configured to place at least one of the clients in one of the host computers in the cluster in accordance with the particular possible distribution of the clients in the host computers.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
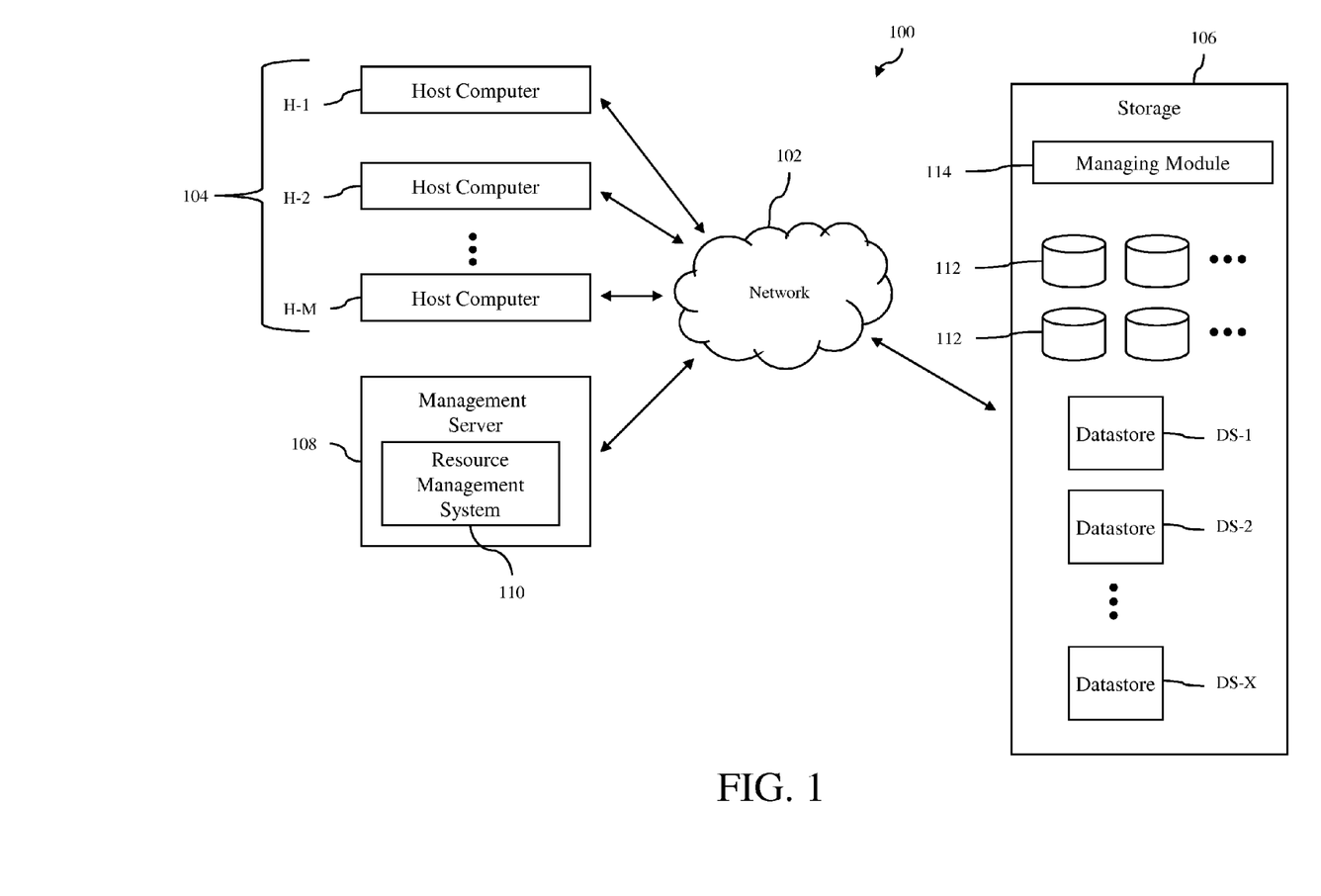
FIG. 1 is a block diagram of a distributed computer system in accordance with an embodiment of the invention.

Turning now to FIG. 1, a distributed computer system 100 in accordance with an embodiment of the invention is shown. As shown in FIG. 1, the distributed computer system includes a network 102, a cluster 104 of host computers H-1, H-2 . . . H-M (where M is a positive integer), storage 106, a management server 108 with a resource management system 110. The host computers, the storage and the management server are connected to the network. Thus, each of the host computers is able to access the storage via the network and may share the resources provided by the storage with the other host computers. Consequently, any process running on any of the host computers may also access the storage via the network.

The host computers H-1, H-2 . . . H-M are physical computer systems that hosts or supports one or more clients so that the clients are executing on the physical computer systems. As used herein, the term "client" is any software entity that can run on a computer system, such as a software application, a software process or a virtual machine (VM). The host computers may be servers that are commonly found in datacenters. As an example, the host computers may be servers installed in a single server rack. However, in other embodiments, the host computers may be installed in multiple server racks in the same or different facilities.

Figure 2:
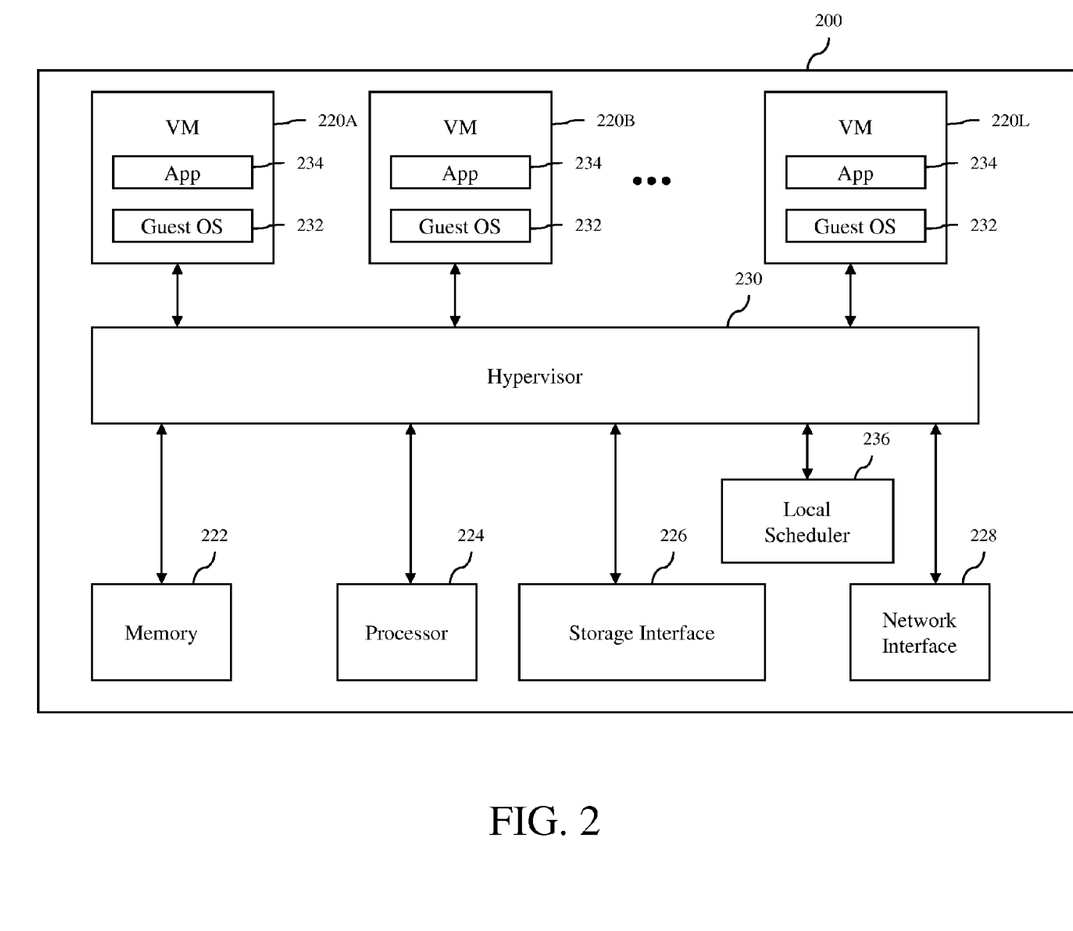
FIG. 2 is a block diagram of a host computer in accordance with an embodiment of the invention.

Turning now to FIG. 2, components of a host computer 200 that is representative of the host computers H-1, H-2 . . . H-M in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include one or more system memories 222, one or more processors 224, a storage interface 226, and a network interface 228. Each system memory 222, which may be random access memory (RAM), is the volatile memory of the host computer. Each processor 224 can be any type of a processor, such as a central processing unit (CPU) commonly found in a server. The storage interface 226 is an interface that allows the host computer to communicate with the storage 106. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on "top" of a hypervisor 230, which is a software interface layer that, using virtualization technology, enables sharing of the hardware resources of the host computer 200 by the VMs. However, in other embodiments, one or more of the VMs can be nested, i.e., a VM running in another VM. Any computer virtualization architecture can be implemented. For example, the hypervisor may run on top of the host computer's operating system or directly on hardware of the host computer. With the support of the hypervisor, the VMs provide isolated execution spaces for guest software. Each VM may include a guest operating system 232 and one or more guest applications 234. The guest operating system manages virtual system resources made available to the corresponding VM by hypervisor 230, and, among other things, guest operating system 232 forms a software platform on top of which guest applications 234 run.

Similar to any other computer system connected to the network 102, the VMs 220A, 220B . . . 220L are able to communicate with each other using an internal software OSI Layer 2 switch (not shown) and with other computer systems connected to the network using the network interface 228 of the host computer 200. In addition, the VMs are able to access the storage 106 using the storage interface 226 of the host computer.

The host computer 200 also includes a local scheduler 236 that operates as part of a resource management system, such as VMware vSphere® Distributed Resource Scheduler™ (DRS) ("VMware vSphere" and "Distributed Resource Scheduler" are trademarks of VMware, Inc.), to manage resource requests made by the VMs 220A, 220B . . . 220L. Although the local scheduler is illustrated in FIG. 2 as being separate from the hypervisor 230, the local scheduler may be implemented as part of the hypervisor. In some embodiments, the local scheduler is implemented as one or more software programs running on the host computer. However, in other embodiments, the local scheduler may be implemented using any combination of software and hardware.

Turing back to FIG. 1, the network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 106 is used to store data for the host computers H-1, H-2 . . . H-M of the cluster 104, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 112, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 114, which manages the operation of the storage. In an embodiment, the storage managing module is a computer program executing on one or more computer systems (not shown) of the storage. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the cluster. For virtual machines, the datastores may be used to store virtual storage, e.g., virtual disks, used by each of the virtual machines, as well as other files needed to support the virtual machines.

The management server 108 operates to monitor and manage the host computers H-1, H-2 . . . H-M in the cluster 104, including clients running on the host computers. As illustrated in FIG. 1, in an embodiment, the management server includes the resource management system 110, which can be enabled by a user, to perform resource management operations for the cluster, such as, but not limited to, resource allocation, load balancing and placement of clients on different host computers in the cluster. As described in more detail below, the resource management system resolves resource contention issues between clients running in the cluster using dispersion rules, which define groups of clients that should be dispersed or scattered among the host computers in the cluster. In the illustrated embodiment, the resource management system 110 is part of the management server 108. However, in other embodiments, the resource management system may be physically separate from the management server and situated external to the management server. Still, in other embodiments, the resource management system may be distributed among different components of the distributed computer system 100 so that parts of the resource management system operate in different components, such as the management server or the host computers. The resource management system may be implemented in any combination of hardware and software. In a particular implementation, the resource management system may be implemented as software programs that are executed by one or more processors of any number of physical computers that are supporting the resource management system, such as the processors of the management server.

In some embodiments, the management server 108 may be a physical computer, and thus, includes memory and one or more processors, as well as other components commonly found in a computer system. In other embodiments, the management server may be implemented as one or more software programs running on one or more physical computers, such as the host computer 200 shown in FIG. 2, or virtual computers, such as the VMs 220A, 220B . . . 220L. In an implementation, the management server is a VMware vCenter™ server with at least some of the features available for such a server, and some or all of the components of the resource management system 110 may be incorporated into VMware DRS.

As mentioned above, the resource management system 110 uses dispersion rules to disperse or scatter groups of clients among the host computers H-1, H-2 . . . H-M in the cluster 104 so that resource contentions between the clients in the designated groups are minimized. The resource management system may use a number of dispersion rules to handle any number of groups of clients. It is noted here that a client may be associated with more than one dispersion rule. Thus, a client may be a member of multiple dispersion groups. The use of dispersion rules allows the resource management system to resolve resource contentions more effectively than conventional resource management systems. For example, some resource contentions, such as CPU and/or memory contentions, between clients, e.g., VMs, may be tracked and remediated by conventional resource management systems via load balancing operations. However, the remediation executed by conventional resource management systems may not be fast enough to maintain desired application performance objectives. As another example, some resource contentions, such as CPU and/or memory contentions relating to smart applications that use throttling, may be hidden from conventional resource management systems, and thus, are not remediated by the resource management systems, which may result in degraded application performance. Furthermore, many resource contentions, such as cache, disk and input/output contentions, between clients may not even be tracked by conventional resource management systems.

Some conventional resource management systems allow users to set affinity and anti-affinity rules, which may reduce some resource contentions. The following are different types of affinity and anti-affinity rules for clients:

(1) Client-host affinity rules associate clients to a group of host computers. Under these rules, the clients are only placed in one of the specified host computers, and are never moved to a host computer outside of this group.

(2) Client-host anti-affinity rules associate a group of clients to a group of host computers. Under these rules, the clients are never placed in any of the host computers from the specified group.

(3) Client-client anti-affinity rules make a group of clients anti-affine to each other. Under these rules, no two clients in the specified group are placed on the same host computer.

(4) Client-client affinity rules make a group of clients affine to each other. Under these rules, the clients in the specified group are placed in the same host computer.

One way handle resource contentions between clients is via the use of client-client anti-affinity rules. However, the application of these rules is an all-or-nothing approach that quits at the first sign of trouble. For example, if 10 VMs, in a 8-host cluster were put into a VM group and an anti-affinity rule was set on this group, a conventional resource management system that uses affinity and anti-affinity rules would realize that it will not be possible to satisfy the anti-affinity rule and give up without trying to disperse the VMs any more from their current state. A dispersion rule used by the resource management system 110 is similar to a client-client anti-affinity rule in that it will try to place each client in the specified group in a different host computer. However, a dispersion rule allows for more than one client to be placed in the same host computer. Thus, an application of a dispersion rule is not abandoned when all the clients that are subject to the dispersion rule cannot be placed in different host computers. Rather, a dispersion rule will spread or scatter the clients, e.g., VMs, in the specified group as much as possible in a cluster of host computers, instead of giving up right away, even when anti-affinity for the clients is not achievable. In the above example, a dispersion rule may allow for a distribution of the clients in the cluster in which 8 host computers have 1 VM each and 2 host computers have 2 VMs each. Thus, the resource management system 110 is able to resolve resource contentions in cases when conventional techniques are not able to do so.

Figure 3:
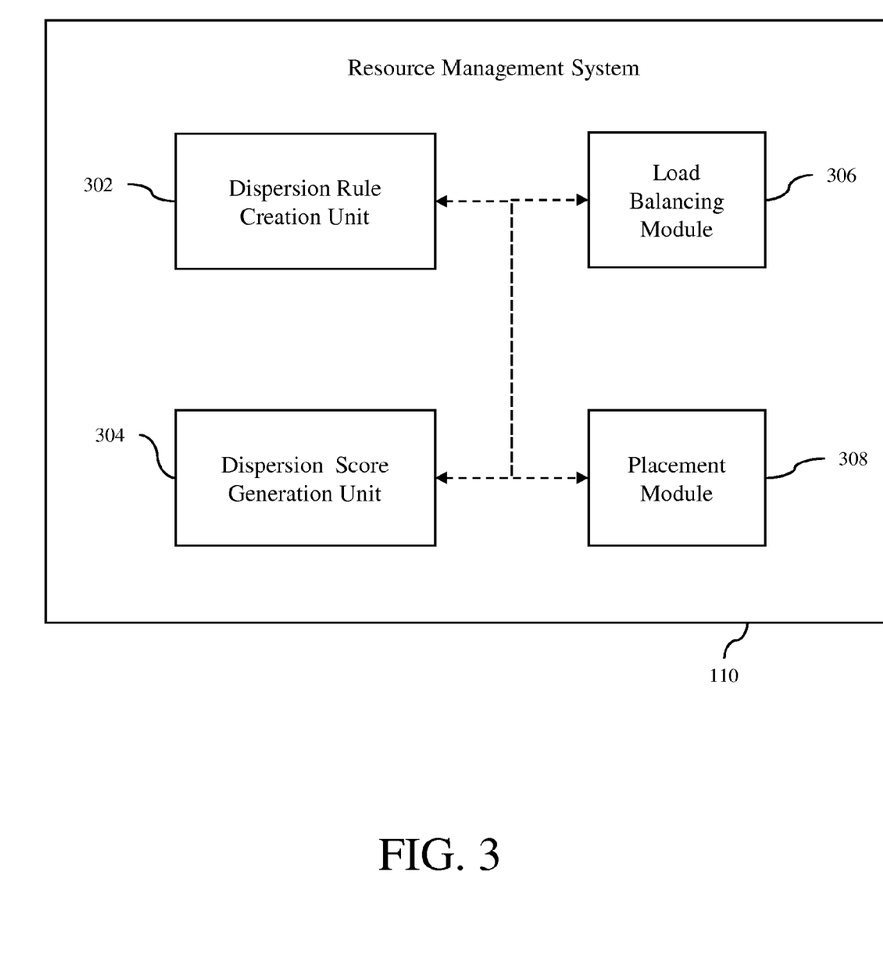
FIG. 3 is a block diagram of a resource management system included in the distributed computer system in accordance with an embodiment of the invention.

Turning now to FIG. 3, components of the resource management system 110 in accordance with an embodiment of the invention are shown. As illustrated in FIG. 3, the resource management system includes a dispersion rule creation unit 302, a dispersion score generation unit 304, a load balancing module 306 and a placement module 308. These components of the resource management system may be implemented in any combination of hardware, software and firmware. In one implementation, these components of the resource management system are implemented as one or more software programs running in the management server 108 using one or more processors associated with or installed in the management server. In other implementations, these components of the resource management system are implemented as one or more software programs running on different devices in the distributed computer system 100 using one or more processors associated with or installed in the different devices.

The dispersion rule creation unit 302 of the resource management system 110 operates to generate dispersion rules to be used by resource management modules, such as the load balancing module 306 and the placement module 308. Each dispersion rule created by the dispersion rule creation unit specifies a group of clients that are designated for dispersal or scatter in the cluster 104 of host computers. That is, a dispersion rule defines a group of clients that should be separated from each others as much as possible in different host computers in the cluster. Thus, clients defined in a dispersion rule will be distributed as wide as possible among the different host computers in the cluster.

The dispersion rule creation unit 302 may generate dispersion rules in response to explicit specification by an administrator of the distributed computer system 100 that designates one or more groups of clients as being marked to be dispersed. The explicit specification can be manually entered into the management server 108 using any input mechanism, such as a keyboard or a touchscreen monitor connected to the management server.

The dispersion rule creation unit 302 may generate dispersion rules automatically using implicit, rule-based inferences of workload relationships between clients by monitoring operational metric values of the clients running in the cluster 104 of host computers. As an example, the dispersion rule creation unit may create a dispersion rule for VMs with % RDY values that exceed a predefined threshold. A % RDY value represents the percentage of time that a virtual machine is ready to execute commands, but has not yet been scheduled for CPU time due to contention with other virtual machines. The dispersion rule creation unit may also generate dispersion rules automatically using proactive inferences of workload relationships between clients based on predicted cyclical demand values of the clients. As an example, if a group of clients is expected to have a high workload during the hours of 9 AM to 5 PM for Monday thru Friday, the dispersion rule creation unit may generate a dispersion rule for these clients during those periods. The dispersion rule creation unit may use these and/or other analyses to determine resource contention correlations between clients to automatically generate dispersion rules for groups of clients.

The dispersion score generation unit 304 of the resource management system 108 operates to generate dispersion scores to be used by at least the load balancing module 306 and the placement module 308. Each dispersion score represents how dispersed the clients, which belong in a dispersion rule, will be for a particular distribution of those clients, i.e., a particular placement of those clients in the cluster 104 of host computers. As described in more detail below, the dispersion scores for a dispersion rule are used to determine a distribution of the clients that will result in the desired dispersion of the clients belonging to the dispersion rule in the cluster. This determination can be used for various resource management operations, including load balancing and initial placement operations.

In an embodiment, a dispersion score for a dispersion rule for a particular distribution of clients that belong to the dispersion rule is computed by the dispersion score generation unit 304 as a standard deviation of the total number of clients that belong to the dispersion rule in each of the host computers. A standard deviation dispersion score may be calculated using the following algorithm for cases where the clients are VMs.

Algorithm 1: Dispersion Score Calculation
Data: Cluster and dispersion rule
Result: Dispersion score of the rule
1 distribution={ }
2 for each Host ∈ Cluster do
3 vmCount←No. of VMs ∈ Host and ∈ Rule
4 distribution=distribution+{vmCount}
5 return StdDev(distribution)

The above algorithm generates a dispersion score of a particular client (VM) distribution in the cluster 104 of host computers for a dispersion rule. The data needed to compute the dispersion score include the dispersion rule, which specifies the clients, i.e., the VMs, that should be dispersed, and cluster data, which includes state information regarding the cluster, such as the host computers included in the cluster and the current host location of the VMs running in the cluster. Initially, a distribution set is defined so that each value in the distribution set is set to zero (line 1). For each host computer, vmCount is computed as the number of VMs that belong to the dispersion rule in that host computer (lines 2-3). In addition, vmCount for each host computer is added to the distribution set (line 4). Once the distribution set has been populated with vmCounts from all the host computers in the cluster, a standard deviation of the distribution set is computed, which is the dispersion score for the dispersion rule for this distribution (line 5).

Figure 4A:
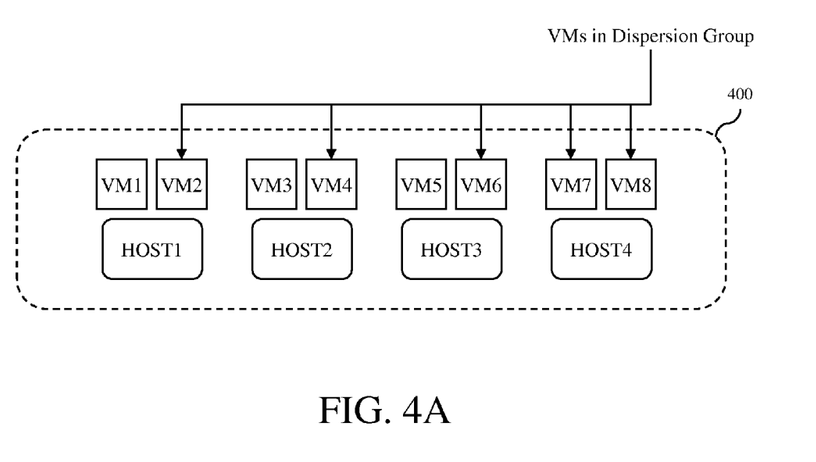
FIGS. 4A and 4B illustrate different dispersion scores for different distributions of clients, e.g., VMs, in a cluster of host computers in accordance with an embodiment of the invention.
Figure 4B:
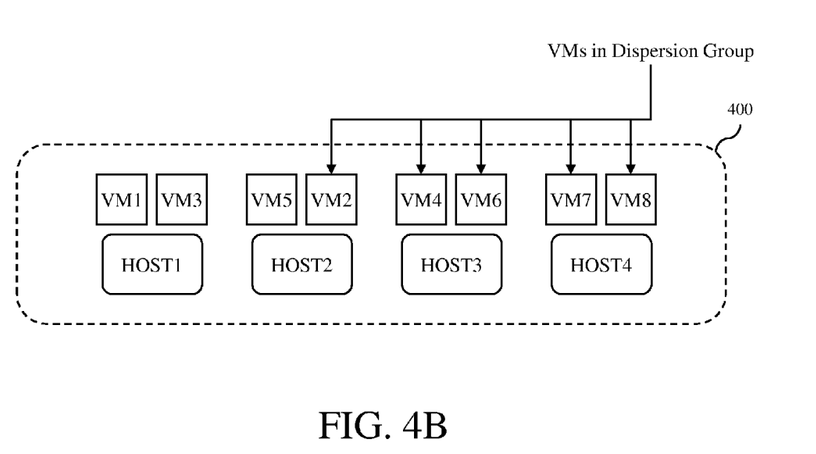

FIGS. 4A and 4B illustrate different dispersion scores for different distributions of VMs in a cluster 400 of host computers. In these examples, the cluster includes four host computers: HOST1, HOST2, HOST3 and HOST 4. In addition, there are eight VMs: VM1, VM2, VM3, VM4, VM5, VM6, VM7 and VM8. The following five VMs belong to a dispersion group defined by a dispersion rule: VM2, VM4, VM6, VM 7 and VM8. In FIG. 4A, the distribution of the VMs in the dispersion group among the four host computers is {1, 1, 1, 2}. Thus, in this distribution, the standard deviation of the number of VMs in the dispersion group in the four host computers, i.e., the dispersion score, is 0.5. In FIG. 4B, the distribution of the VMs in the dispersion group among the four host computers is {0, 1, 2, 2}. Thus, in this distribution, the standard deviation of the number of VMs in the dispersion group in the four host computers, i.e., the dispersion score, is 0.9574. Thus, the distribution of VMs shown in FIG. 4A has a better dispersion score than the distribution of VMs shown in FIG. 4B.

In other embodiments, a dispersion score for a dispersion rule for a particular distribution of clients that belong to the dispersion rule is computed by the dispersion score generation unit 304 as another statistical dispersion measure of the total number of clients that belong to the dispersion rule in each of the host computers. Any statistical dispersion measure may be used to compute dispersion scores by the dispersion score generation unit. As an example, any of the following statistical dispersion measure may be used as dispersion scores: interquartile range (IQR) or interdecile range, mean difference, median absolute deviation (MAD), average absolute deviation ("average deviation") and distance standard deviation.

The load balancing module 306 of the resource management system 110 performs load balancing operations in the cluster 104 of host computers. The load balancing module may move or migrate some of the clients running in the cluster from their current (source) host computers to other (destination) host computers in the cluster to achieve better load balance. Thus, the load balancing module may place one or more clients running on some of the host computers in the cluster in one or more different host computers in the cluster. As described in more detail below, the load balancing module performs load balancing operations at least partly based on dispersion rules created by the dispersion rule creation unit 302. Thus, in decisions relating to which clients to migrate to which host computers, the load balancing module takes into consideration the dispersion rules that may exist for the clients running in the cluster.

In some embodiments, the load balancing module 306 uses dispersion scores generated by the dispersion score generation unit 304 in making load balancing decisions. Thus, when considering different possible distributions of clients in the host computers in the cluster 104 to improve load balance for the cluster, the load balancing module considers the dispersion scores for the different possible distributions of clients in the host computers in the cluster, in addition to any other metrics for the different distributions, to select one of the distributions to improve load balance in the cluster.

In an embodiment, the load balancing module 306 uses a greedy hill-climbing technique to determine the best possible move recommendations that will balance out workload in the cluster 104. At each step of this greedy approach, the load balancing module selects one possible distribution of clients in the cluster from a number of different possible distributions of clients in the cluster, where each distribution can be achieved by migration of a single client from its current host computer in the cluster to a different host computer in the cluster. As used herein, each distribution of clients in the cluster can be viewed as being a unique state of the cluster, which specifies which clients are located in which host computers in the cluster. Thus, a distribution of clients in the cluster may sometimes be referred to herein as a "state" of the cluster. Each of the possible states of the cluster has at least two attributes, one of which is a dispersion score. The other attributes of that cluster state may be metrics that represents how well that cluster state is load balanced. As an example, the other attributes may include a goodness score, which represents cumulative client throughput, where a higher goodness score is equated to a cluster state that is better load balanced. Thus, a goodness score can be viewed as a measure of the improvement of imbalance that any client migration, e.g., VM migration, may bring to the cluster.

The greedy hill-climbing technique performed by the load balancing module 306 involves a multi-attribute or multi-dimensional decision tree analysis in which a child node for a given node on a multi-dimensional decision tree is selected until the final node has been selected to determine a decision path of the decision tree in consideration of the different attributes of the nodes on the decision tree. The nodes on the decision tree represent different states of the cluster 104, where each cluster state defines a distribution of clients among the host computers in the cluster. The multi-dimensional decision tree analysis performed by the load balancing module begins with the root node of a decision tree, which is the current state of the cluster, and ends with the final node on the decision, which is the final recommended state of the cluster. Each selection of a child node of a given node is a single step from the level of the decision tree on which the given node is situated to the next lower level of the decision tree on which the selected child node is situated. Each selection of a child node represents one recommendation to migrate one client from its current host computer in the cluster to a different host computer in the cluster. By sequentially taking these steps from the root node down to the final node, the load balancing module is able to navigate through the decision tree to reach the final node on the decision tree, which results in a sequence of recommendations to migrate one or more clients in the cluster to achieve a cluster state that is better load balanced.

For each decision to select a child node of a given parent node, the load balancing module 306 determines a target child node among the child nodes of that parent node using a predefined criterion for the first attribute and then determines any other child node of that parent node that can be considered to be an acceptable alternative to the target child node with respect to that attribute, i.e., an "acceptable alternative child node". As an example, in some embodiments, the predefined criterion for the target child node selection may be the child node having the maximum or minimum value for the attribute being considered. In these embodiments, the load balancing module determines the child node with the highest or lowest value for the attribute being considered as the target child node. As another example, in other embodiments, the predefined criterion for the target child node selection may be the child node having a value for the attribute being considered that is closest to a target value.

After the target child node has been determined, an acceptance parameter for the attribute currently being consider is used to determine whether there is any other child node that can be considered to be an acceptable alternative to the selected target child node. As used herein, "acceptable alternative child nodes" are nodes on the same level of a decision tree having similar metric values as a target node for a particular attribute. This determination of whether metric values of an attribute are similar to a target node is defined using an acceptance parameter, which may be preset or manually set by a user. The acceptance parameters for the different attributes of the nodes on a decision tree may vary from one attribute to another.

The target child node and any acceptable alternative nodes are grouped together by the load balancing module 306 as candidate child nodes to determine the target child node and any acceptable alternative nodes for the next attribute. This determination of candidate child nodes is repeated until the last attribute is being considered, at which point only the target child node from the latest group of candidate child nodes is selected. This process of selecting a child node for a parent node is repeated until the final child node is selected. When the final child node on the decision tree has been selected, the decision tree analysis operation of the load balancing module comes to an end.

Below is an example of a multi-dimensional decision algorithm executed by the load balancing module 306 in accordance with an embodiment of the invention to select a child node of a parent node to increase a decision path through a decision tree by one step. In this multi-dimensional decision algorithm, k represents the number of attributes associated with each node on the decision tree.

1. Set i=1, set equivalence class e_0 to contain all child nodes of a parent node on the decision tree (initially, the parent node is the root node)
2. while (i<k), do:
    2.1. Use the greedy choice from e_(i−1) with respect to attribute #i and acceptance parameter del_i to define an equivalence class e_i
    2.2. i=i+1
3. Return greedy choice from e_(k−1) with respect to attribute #k Step 1 of the algorithm defines the initial group of candidate child nodes of a parent node from which a node selection will be made. Specifically, an equivalence class is set to contain all child nodes of the parent node. Step 2 of the algorithm reduces the group of candidate child nodes for each attribute by selecting a target child node and any acceptable alternative child nodes from the previous group of candidate child nodes. Specifically, in this embodiment, for each attribute, a greedy choice is made from the previous equivalence class and any acceptable alternative child nodes are determined using the acceptance parameter for that attribute. Then, the next equivalence class is set to contain the greedy choice and any acceptable alternative child nodes. This process is repeated until the last attribute is being considered. Step 3 of the algorithm defines the child node selection as the greedy choice for the last attribute. This child node selection for the parent node defines one step of the total navigation path for the decision tree. The child node selection process is repeated until the final node on the decision tree has been selected to complete the navigation path.

Figure 5:
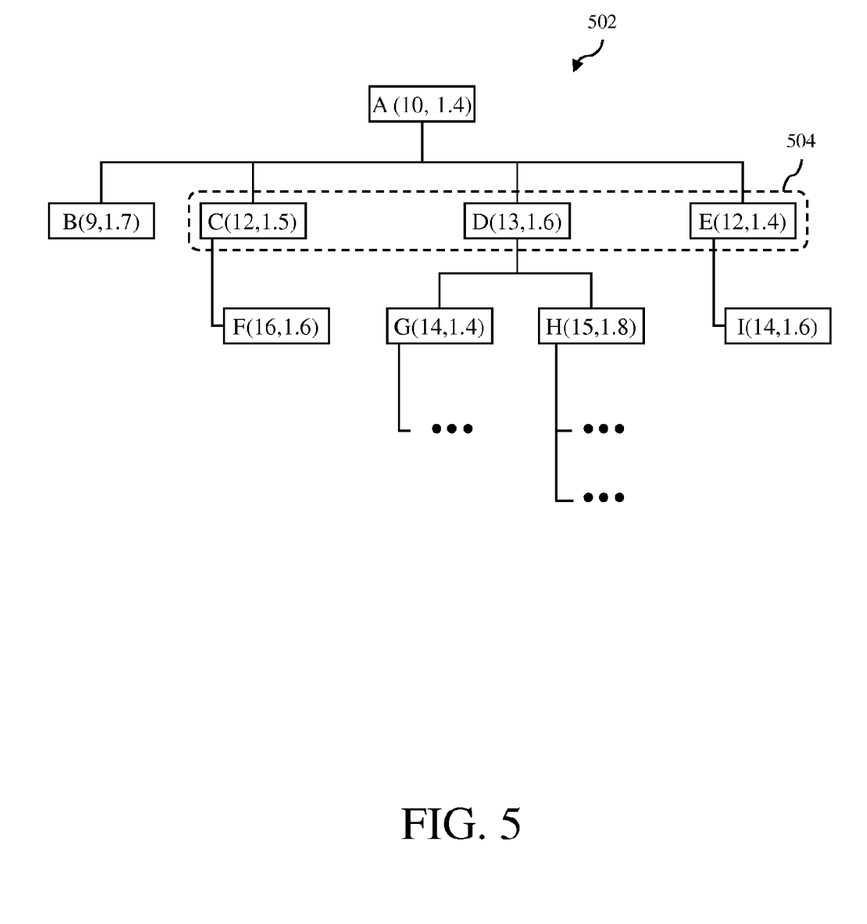
FIG. 5 illustrates a multi-dimensional decision algorithm executed by a load balancing module of the resource management system using an example of a multi-dimensional decision tree in accordance with an embodiment of the invention.

The multi-dimensional decision algorithm executed by the load balancing module 306 is further described using a decision tree 502 shown in FIG. 5 as an example. In this example, each node of the decision tree has two attributes that are defined by numerical values, i.e., k=2. The first attribute is the goodness score and the second attribute is the dispersion score. In addition, in this example, there is only one acceptance parameter $\delta$ for the first attribute that equals one (1), i.e., $\delta(1)=1$. Furthermore, in this example, the greedy choice for the first attribute is the child node with the highest goodness score and the greedy choice for the second attribute is the child node with the lowest dispersion score.

When initiated, the multi-dimensional decision algorithm determines a decision path for the decision tree by sequentially selecting a child node of a parent node on the decision tree starting from the root node, where each selected child node is used as the next parent node until the final child node is selected. In the example illustrated in FIG. 4, the multi-dimensional decision algorithm begins by selecting one of the child nodes B, C, D and E of the root node A to determine the first single step of the decision path.

In order to select one of the child nodes B, C, D and E of the root node A, the multi-dimensional decision algorithm defines an equivalence class e_0 as containing all the child nodes of the root node, i.e., the child nodes B, C, D and E. The multi-dimensional decision algorithm then defines an equivalence class e_1 using the greedy choice from the class e_0 for the first attribute, i.e., the target child node selected from the child nodes B, C, D and E for the first attribute, and any acceptable alternative child nodes using the acceptance parameter $\delta(1)=1$. In this example, the greedy choice is the child node D since it has the highest goodness value of "13", and the child nodes C and E are acceptable alternative child nodes since they both have a goodness value of "12", which is within the acceptance value range defined by the acceptance parameter $\delta(1)=1$. Thus, the equivalence class e_1 includes the child nodes C, D and E, as indicated by reference number 504 in FIG. 5. Since the second attribute is the last attribute for this example, the multi-dimensional decision algorithm then selects the greedy choice from the equivalence class e_1 for the second attribute, i.e., the dispersion score, which is the child node E.

The multi-dimensional decision algorithm then repeats the process to select a child node of the selected node E. In this example, there is only one child node for the node E, which is the child node F. Thus, the decision path of the decision tree determined by the multi-dimensional decision algorithm is as follows: node A-node E-node I. These nodes represent recommendations to migrate one or more clients in the cluster to achieve a cluster state that is better load balanced than the current cluster state.

In some embodiments, if there are two or more child nodes with the same attribute value for the greedy choice, then the multi-dimensional decision algorithm may selected one of the child nodes with the same attribute value at random or using some other selection method, such as the first child node or the last child node. In addition, at each selected node, only the dispersion scores for the child nodes of that selected node are generated by the dispersion score generation unit 304.

In other embodiments, the load balancing module 306 may apply dispersion scores in other manners for load balancing. There are multiple ways in which these dispersion scores can be incorporated for load balancing. As an example, a dispersion score may be used as a factor in computing one or more load balancing metrics, such as the goodness score. As another example, weighted averages of the dispersion scores and other load balancing metrics may be used in the load balancing analysis.

For more details regarding multi-dimensional decision tree analyses, see U.S. patent application, titled "System and Method for Navigating multi-dimensional decision trees using Acceptable Alternative Nodes," which is incorporated herein by reference.

The placement module 308 of the resource management system 110 operates to determine the initial placements of new clients in the host computers in the cluster 104 and the placements of virtual disks for the new clients in the datastores DS-1, DS-2 . . . DS-X. In an embodiment, the placement module selects a host computer among all possible host computers in the cluster that can support a client to be placed and a datastore connected to the selected host computer for client placement. The placement module searches for suitable host computers in the cluster that can satisfy the resource requirements of a client to be placed, such as CPU, RAM, network and storage resources, and any policy requirements for the client to be placed, such as affinity and anti-affinity rules. In selecting one of the suitable host computers to place the client, the placement module considers current resource utilization metrics of the host computers, i.e., how much resources are being utilized at the host computers. In addition, the placement module also considers any dispersion rule to which the client to be placed belongs in selecting a suitable host computer to place the client. When considering storage utilization metrics, the placement module determines the best datastore connected to each suitable host computer. When a suitable host computer is selected for the client, the best datastore connected to that host computer is also selected for the client.

In some embodiments, the placement module 308 ranks the suitable host computers in the cluster 104 using the resource utilization metrics. As an example, a suitable host computer with low CPU utilization metrics may be ranked higher than a suitable host computer with higher CPU utilization metrics. Rather than selecting the suitable host computer with the highest ranking, the placement module may consider a few top ranked suitable host computers using dispersion scores. The number of top ranked suitable host computers that are considered may be predefined or manually set by a user. As an example, the top five suitable host computers may be considered. For each of these suitable host computers being considered, a dispersion score may be generated by the dispersion score generation unit 304, which corresponds to the client distribution state of the cluster if the client being placed is actually placed in that suitable host computer. Thus, in this example, only the dispersion scores for the client distribution states of the cluster that correspond to the top five suitable host computers are generated by the dispersion score generation unit 304. Using the dispersion scores, the placement module then selects the suitable host computer with the best dispersion score, i.e., the lowest dispersion score. The new client will then be placed in the selected host computer, which can be executed automatically or after user approval.

In other embodiments, the placement module 308 may apply dispersion scores in other manners for initial client placement. As an example, dispersion scores may be used as an additional factor in ranking the suitable host computers in the cluster 104 to select a host computer to place a new client.

Figure 6:
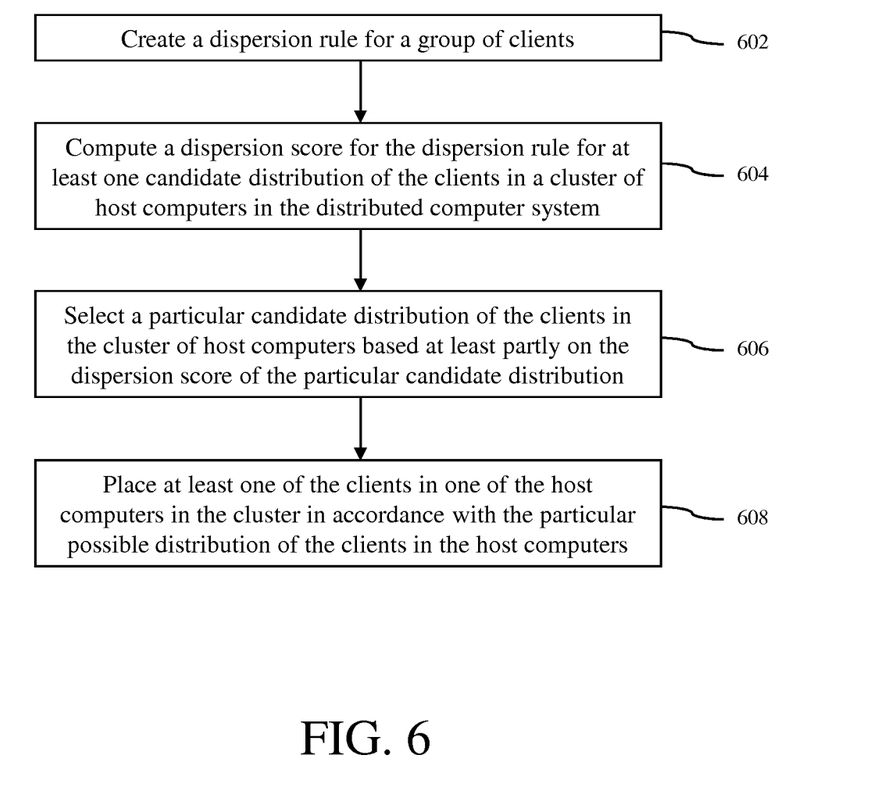
FIG. 6 is a flow diagram of a method for performing resource management operations in a distributed computer system in accordance with an embodiment of the invention.

A method for performing resource management operations in a distributed computer system in accordance with an embodiment of the invention is described with reference to a flow diagram of FIG. 6. At block 602, a dispersion rule for a group of clients is created. In some embodiments, the dispersion rule is automatically created by the dispersion rule creation unit 302 in response to manual input by an administrator or in response inferences of workload relationships between clients in the distributed computer system. At block 604, a dispersion score is computed for the dispersion rule for at least one candidate distribution of the clients in a cluster of host computers in the distributed computer system. In some embodiments, the dispersion scores are automatically generated by the dispersion score generation unit 304 in response to requests made by the load balancing module 306 or the placement module 308. At block 606, a particular candidate distribution of the clients in the cluster of host computers is selected based at least partly on the dispersion score of the particular candidate distribution. In some embodiments, the selection of the particular candidate distribution of the clients in the cluster of host computers is generated by the load balancing module 306 as part of a load balancing operation, which may involve a multi-dimensional decision tree analysis. In other embodiments, the selection of the particular candidate distribution of the clients in the cluster of host computers is generated by the placement module 308 as part of an initial placement operation. At block 608, at least one of the clients is placed in one of the host computers in the cluster in accordance with the particular possible distribution of the clients in the host computers. In some embodiments, the placement of the least one of the clients in one of the host computers in the cluster is executed as part of a load balancing operation to migrate one or more clients from their current host computers in the cluster to different host computers in the cluster. In other embodiments, the selection of the particular candidate distribution of the clients in the cluster of host computers is part of an initial placement operation.

The dispersion rules described herein can also be used to better handle workload in datacenters. Typically in datacenters, there will be different type of workloads, some CPU intensive, some IO intensive etc. Profiling/categorizing these workloads is a well-studied problem in literature. A load balancer, similar to VMware vSphere® DRS, can use the workload category and auto-create dispersion rules, which will enable the system to co-locate workloads that complement each other.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:
1. A method for performing resource management operations in a distributed computer system, the method comprising:
creating a dispersion rule for a group of clients, the dispersion rule specifying the group of clients to be dispersed among host computers in a cluster of host computers in the distributed computer system;
computing a dispersion score for the dispersion rule for at least one candidate distribution of the clients in the cluster of host computers in the distributed computer system, the dispersion score representing how dispersed the clients will be for the at least one candidate distribution of the clients, wherein computing the dispersion score includes:
defining a distribution set for a distribution;
computing the number of clients that belong to the dispersion rule for each host computer in the cluster in the distribution;
adding the number of clients for each host computer in the cluster to the distribution set; and
computing a standard deviation of the distribution set, the computed standard deviation being the dispersion score for the distribution;
selecting a particular candidate distribution of the clients in the cluster of host computers based at least partly on the dispersion score of the particular candidate distribution; and
placing at least one of the clients in one of the host computers in the cluster in accordance with the particular possible distribution of the clients in the host computers.

2. The method of claim 1, wherein the dispersion rule allows for two clients in the group of clients to be placed on the same host computer in the cluster of host computers.

3. The method of claim 1, wherein the placing of the at least one of the clients is part of a load balancing process in which a client is migrated from a source host computer in the cluster to a destination host computer in the cluster.

4. The method of claim 1, wherein the selecting of the particular candidate distribution of the clients in the cluster of host computers is part of a multi-dimensional decision tree analysis in which multiple attributes are considered for different candidate distributions of the clients in the cluster of host computers in selecting the particular candidate distribution, one of the multiple attributes considered by the multi-dimensional decision tree analysis being the dispersion score.

5. The method of claim 4, wherein the multi-dimensional decision tree analysis comprises:
determining a target candidate distribution of the clients in the cluster of host computers among candidate distributions of the clients in the cluster of host computers based on a first attribute value;
determining any predefined alternative candidate distribution of the clients in the cluster of host computers among candidate distributions of the clients in the cluster of host computers based on a predefined delta parameter for the first attribute value, the predefined delta parameter defining a value range about the first attribute value of the target candidate distribution within which a candidate distribution is determined to be an alternative candidate distribution of the target candidate distribution; and
selecting the particular candidate distribution from the target candidate distribution and any predefined alternative candidate distribution based on a second attribute value of each of the target candidate distribution and any predefined alternative candidate distribution.

6. The method of claim 1, wherein the placing of the at least one of the clients is part of an initial placement process in which a client is instantiated and placed in one of the host computers in the cluster.

7. The method of claim 1, wherein the creating of the dispersion rule for the group of clients includes automatically creating the dispersion rule for the group of clients at least partly based on inferences of workload relationships between the clients using operational metrics of the clients.

8. A non-transitory computer-readable storage medium containing program instructions for performing resource management operations in a distributed computer system, wherein execution of the program instructions by one or more processors of a computer system causes the one or more processors to perform steps comprising:
creating a dispersion rule for a group of clients, the dispersion rule specifying the group of clients to be dispersed among host computers in a cluster of host computers in the distributed computer system;
computing a dispersion score for the dispersion rule for at least one candidate distribution of the clients in the cluster of host computers in the distributed computer system, the dispersion score representing how dispersed the clients will be for the at least one candidate distribution of the clients, wherein computing the dispersion score includes:
defining a distribution set for a distribution;
computing the number of clients that belong to the dispersion rule for each host computer in the cluster in the distribution;
adding the number of clients for each host computer in the cluster to the distribution set; and
computing a standard deviation of the distribution set, the computed standard deviation being the dispersion score for the distribution;
selecting a particular candidate distribution of the clients in the cluster of host computers based at least partly on the dispersion score of the particular candidate distribution; and
placing at least one of the clients in one of the host computers in the cluster in accordance with the particular possible distribution of the clients in the host computers.

9. The computer-readable storage medium of claim 8, wherein the dispersion rule allows for two clients in the group of clients to be placed on the same host computer in the cluster of host computers.

10. The computer-readable storage medium of claim 8, wherein the placing of the at least one of the clients is part of a load balancing process in which a client is migrated from a source host computer in the cluster to a destination host computer in the cluster.

11. The computer-readable storage medium of claim 8, wherein the selecting of the particular candidate distribution of the clients in the cluster of host computers is part of a multi-dimensional decision tree analysis in which multiple attributes are considered for different candidate distributions of the clients in the cluster of host computers in selecting the particular candidate distribution, one of the multiple attributes considered by the multi-dimensional decision tree analysis being the dispersion score.

12. The computer-readable storage medium of claim 11, wherein the multi-dimensional decision tree analysis comprises:
determining a target candidate distribution of the clients in the cluster of host computers among candidate distributions of the clients in the cluster of host computers based on a first attribute value;
determining any predefined alternative candidate distribution of the clients in the cluster of host computers among candidate distributions of the clients in the cluster of host computers based on a predefined delta parameter for the first attribute value, the predefined delta parameter defining a value range about the first attribute value of the target candidate distribution within which a candidate distribution is determined to be an alternative candidate distribution of the target candidate distribution; and selecting the particular candidate distribution from the target candidate distribution and any predefined alternative candidate distribution based on a second attribute value of each of the target candidate distribution and any predefined alternative candidate distribution.

13. The computer-readable storage medium of claim 8, wherein the placing of the at least one of the clients is part of an initial placement process in which a client is instantiated and placed in one of the host computers in the cluster.

14. The computer-readable storage medium of claim 8, wherein the creating of the dispersion rule for the group of clients includes automatically creating the dispersion rule for the group of clients at least partly based on inferences of workload relationships between the clients using operational metrics of the clients.

15. A resource management system supported by hardware in a distributed computer system comprising:
memory; and
a processor configured to:
create a dispersion rule for a group of clients, the dispersion rule specifying the group of clients to be dispersed among host computers in a cluster of host computers in the distributed computer system;
compute a dispersion score for the dispersion rule for each candidate distribution of the clients in the cluster of host computers in the distributed computer system, the dispersion score representing how dispersed the clients will be for the at least one candidate distribution of the clients, wherein computing the dispersion score includes:
defining a distribution set for a distribution;
computing the number of clients that belong to the dispersion rule for each host computer in the cluster in the distribution;
adding the number of clients for each host computer in the cluster to the distribution set; and
computing a standard deviation of the distribution set, the computed standard deviation being the dispersion score for the distribution; and
select a particular candidate distribution of the clients in the cluster of host computers based at least partly on the dispersion score of the particular candidate distribution, the resource management module being further configured to place at least one of the clients in one of the host computers in the cluster in accordance with the particular possible distribution of the clients in the host computers.

16. The resource management system of claim 15, wherein the dispersion rule allows for two clients in the group of clients to be placed on the same host computer in the cluster of host computers.

17. The resource management system of claim 15, wherein the processor is configured to place the at least one of the clients in one of the host computers in the cluster as part of a load balancing process in which a client is migrated from a source host computer in the cluster to a destination host computer in the cluster.

18. The resource management system of claim 17, wherein the processor is configured to select the particular candidate distribution of the clients in the cluster of host computers as part of a multi-dimensional decision tree analysis in which multiple attributes are considered for different candidate distributions of the clients in the cluster of host computers in selecting the particular candidate distribution, one of the multiple attributes considered by the multi-dimensional decision tree analysis being the dispersion score.

19. The resource management system of claim 15, wherein the processor is configured to place the at least one of the clients as part of an initial placement process in which a client is instantiated and placed in one of the host computers in the cluster.

20. The resource management system of claim 15, wherein the processor is configured to automatically create the dispersion rule for the group of clients at least partly based on inferences of workload relationships between the clients using operational metrics of the clients.

* * * * *